(12) United States Patent
Revelant et al.

(10) Patent No.: US 6,492,456 B1
(45) Date of Patent: Dec. 10, 2002

(54) METHOD FOR SEPARATING A COMPOUND OBTAINED BY POLYMERIZATION OF NON-TRANSFORMED MONOMER ISOCYANATES

(75) Inventors: Denis Revelant, Genas (FR); Eugénie Charriere, Lyons (FR); Jean-Marie Bernard, Mornant (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/530,564

(22) PCT Filed: Nov. 4, 1998

(86) PCT No.: PCT/FR98/02358

§ 371 (c)(1),
(2), (4) Date: Jun. 15, 2000

(87) PCT Pub. No.: WO99/23132

PCT Pub. Date: May 14, 1999

(30) Foreign Application Priority Data

Nov. 4, 1997 (FR) .......................................... 97 13 857

(51) Int. Cl.[7] .............................. C08J 3/00; C08K 3/20; C08L 75/00
(52) U.S. Cl. ..................... 524/589; 524/590; 525/123; 525/127; 525/455; 528/44; 528/67; 528/73
(58) Field of Search .............................. 524/589, 590; 528/44, 67, 73; 525/123, 127, 455

(56) References Cited

U.S. PATENT DOCUMENTS

| | | |
|---|---|---|
| 4,910,332 A | 3/1990 | Lothar et al. |
| 5,159,045 A | * 10/1992 | Haseyama et al. |

FOREIGN PATENT DOCUMENTS

| | | |
|---|---|---|
| CA | 2154107 | * 1/1996 |
| EP | 0 458 333 | 5/1991 |
| EP | 0 693 512 | 1/1996 |

* cited by examiner

*Primary Examiner*—Patrick D. Niland
(74) *Attorney, Agent, or Firm*—Burns, Doane, Swecker & Mathis, L.L.P.

(57) ABSTRACT

This invention relates to a process for separating one (or more) oligomeric or polymeric compound(s) (A) obtained by polymerization of isocyanate monomers ($A_1$) or copolymerization of isocyanate monomers with another polymerizable compound ($A_2$), in particular a polyol, the said compound(s) A having a viscosity (a), from the unconverted monomer(s), this process comprising addition to the said compound(s) (A) of one (or more) compound(s) (B) consisting of the product of polymerization of isocyanate monomers ($B_1$) or of copolymerization of isocyanate monomers with another polymerizable compound ($B_2$), in particular a polyol, the said compound(s) (B) having a viscosity (b) and the ratio of the viscosities b/a being less than 1/1.5, preferably less than 1/2, and co-distillation of (A) and (B), in order to separate the compound(s) (A) from the corresponding unconverted monomers.

28 Claims, No Drawings

METHOD FOR SEPARATING A COMPOUND OBTAINED BY POLYMERIZATION OF NON-TRANSFORMED MONOMER ISOCYANATES

The invention relates to a process for reducing the viscosity of compositions resulting from the polymerization of isocyanate monomers or from copolymerization of isocyanate monomers with another polymerizable compound, which generally have a high viscosity at room temperature, and for allowing the separation of the high-viscosity polymerization product from the corresponding isocyanate monomer.

During the preparation of oligomeric or polymeric compounds by polymerization of starting isocyanate monomers, or copolymerization with a compound other than an isocyanate, in particular a polyol, a resulting mixture is obtained which contains the desired oligomer or (pre) polymer and, predominantly, the unreacted monomer(s), which should be separated from the products of higher molar mass.

In particular, during the catalytic cyclotrimerization of isocyanate monomers, in particular of diisocyanate monomers, the resulting mixture contains the isocyanurate, polyisocyanate where appropriate, resulting from the condensation of at least three starting monomers, as well as unconverted monomers.

Now, one of the obstructions to the industrial preparation of (poly)isocyanurate polyisocyanates, in particular those obtained by catalytic cyclotrimerization of cycloaliphatic isocyanates, has up to the present been the separation of the unconverted monomer from the condensation products of higher mass.

The reason for this is that a large number of the compositions, in particular polyisocyanates, obtained after a catalytic (cyclo)trimerization reaction comprise polymerization products which have, at the separation temperatures usually used, a high viscosity or are even solid at these temperatures.

Thus, during the preparation of IPDT (isophorone diisocyanate trimer) which is obtained by catalytic cyclotrimerization of isophorone diisocyanate (IPDI or 1-isocyanato-3,3,5-trimethyl-5-isocyanatomethylcyclohexane), a mixture of polyisocyanates, in particular containing isocyanurate units, is obtained, which, in the purified state (IPDI content of less than 0.5%), is a solid whose melting point is about 110–115° C. and in addition a non-newtonian fluid (viscosity at T>115° C. depends on the coefficient of shear). Separation of the IPDI from the crude trimerization mixture in the evaporators used for this purpose, in particular scraped-film evaporators, consequently requires the use of higher temperature levels than in the case of the separation of monomers of polymethylene diisocyanate type from the crude trimerization mixture obtained by polyaddition of these monomers.

In particular, in the final step of evaporation of the IPDIs, it is necessary to work at more than 200° C. in order to remove all of the IPDI and to make the IPDT conveyable.

On an industrial scale, such operating conditions require adaptations which increase the duration and cost of the process: change of exchangers, accelerating pump on the IPDT before formulation, line plotting, etc.

In addition, the transportation of purified IPDT remains difficult on account of considerable losses of load, risks of blockage, difficulty in rinsing the lines, greater cross-contamination, etc.

Moreover, there is a need in the coating industry for low-viscosity polyisocyanate compositions which combine a certain number of properties often obtained only by using isocyanates of different nature.

Thus, EP 693,512 describes a polyurethane coating composition comprising a polyisocyanate component and a polyol component, the polyisocyanate component being obtained by mixing:

($A_1$) from 50 to 95% by weight of a 1,6-diisocyanatohexane-based polyisocyanate lacquer with a viscosity at 23° C. of from 100 to 4000 mPa.s; and ($A_2$) from 5 to 50% by weight of a polyisocyanate containing isocyanurate groups, based on cycloaliphatic diisocyanates.

The polyisocyanate component can be obtained by adding, during the preparation of component $A_2$, compound $A_1$ to the crude reaction mixture at the end of the trimerization reaction and by then removing the excess cycloaliphatic monomers by thin-film distillation.

By virtue of the invention, it has been discovered, surprisingly, that by adding to an oligomer/polymer composition of high viscosity, obtained by polymerization, in particular catalytic (cyclo)trimerization, of starting isocyanate monomers, in particular of diisocyanates, or by copolymerization of these compounds with another polymerizable compound, an amount of less than 50% by weight of the monomer-free mixture of a product with a substantially lower viscosity than that of the high-viscosity oligomer/polymer composition, the viscosity of the polymer/oligomer composition can be reduced substantially, so as to allow separation by distillation (evaporation) of the high-viscosity oligomer or polymer from the unconverted isocyanate monomer(s) and to obtain this oligomer or polymer in high purity comprising less than 1%, preferably less than 0.5%, by weight of the corresponding unconverted isocyanate monomer(s).

In addition, the final compositions containing the mixture of oligomers/polymers of high and low viscosity in the proportions indicated have particularly advantageous application properties for the production of coatings, since some of its properties are better than those obtained with a simple mixture of the two types of polyisocyanate components in the same proportions.

For the purposes of the present invention, the expression high viscosity is intended to mean a viscosity generally of greater than $10^4$ mPa.s at 25° C., including compounds which are solid at 25° C.

For the purposes of the present invention, the expression low viscosity is intended to mean a viscosity generally of less than $5 \times 10^3$ mPa.s at 25° C. The viscosities are measured according to DIN standard 53019.

More generally, the ratio of the viscosities of the low-viscosity compound to the high-viscosity compound must be less than 1/1.5, preferably less than about 1/2.

The subject of the invention is thus a process for separating one (or more) oligomeric or polymeric compound(s) A obtained by polymerization or polycondensation of isocyanate monomers ($A_1$) with each other or polymerization or polycondensation of isocyanate monomers ($A_1$) with another copolymerizable monomer compound ($A_2$), from the unconverted monomer(s), the said compound(s) A having, in the presence of an amount of monomers ($A_1$ and optionally $A_2$) of not more than 1% by weight, preferably not more than 0.5% by weight, a viscosity (a), this process comprising the following steps:

i) the viscosity of the crude polymerization or polycondensation mixture containing the said compound(s) A is lowered by adding thereto one or more compound(s) B of viscosity (b) such that b/a is less than 1/1.5, and preferably less than 1/2, in an amount of less than 50% by weight of the mixture A plus B; and ii) the mixture thus obtained is co-distilled so as to separate the compound(s) (A) and (B) from the unconverted monomers.

(A) and (B) are preferably miscible at the distillation temperature.

$A_2$ is advantageously a polyfunctional monomer compound containing a labile hydrogen, in particular a polyol.

$B_2$ is advantageously a polyfunctional monomer compound containing a labile hydrogen, in particular a monofunctional or polyfunctional alcohol.

(B) can be, in particular, a molecule with a boiling point, expressed in degrees Kelvin, at atmospheric pressure, which is substantially higher, advantageously by at least 20%, preferably by at least 30%, than the highest boiling point of $A_1$ and $A_2$.

(B) is advantageously an oligomeric or polymeric compound obtained by polymerization of isocyanate monomers ($B_1$) or copolymerization of isocyanates ($B_1$) with another polymerizable compound ($B_2$).

(B) can also be a varnish or paint additive such as a "mar-resistance" agent, a spreading agent or a surfactant to help disperse A and B in aqueous media, or another additive used to give any property to a composition for preparing coatings.

The compounds A and B can also consist of a mixture of the compounds described above. In particular, A and B can comprise a mixture of polyisocyanates obtained by polymerization of identical or different monomers, and when they comprise copolymers, these can be obtained from mixtures of monomers and comonomers.

It is preferred to select A and B such that they do not react with each other, with the exception of the reactions which take place between the isocyanate functions which they bear, under the conditions of the process.

Advantageously, the molecular weight (Mw) of compound A is not greater than 3000, preferably than 2000 and more preferably than 1500.

Advantageously, the molecular weight (Mw) of compound B is not greater than 10,000, preferably than 5000 and more preferably than 2000.

The isocyanate functions in compounds (A) and (B) can also be totally or partly blocked with a blocking or masking group. Such a blocking or masking group will be selected such that it is not released at the distillation temperature of the (A)/(B) mixture.

An advantageous protecting group is a polyoxyalkylene group, in particular polyoxyethylene.

Advantageously, the low-viscosity compound (B), referred to as the viscosity-reducing product, is a polyisocyanate optionally containing isocyanurate unit(s), obtained by catalytic (cyclo)trimerization of isocyanate monomers or of a mixture of isocyanate monomers, optionally comprising carbamate, biuret, uretdione and/or allophanate groups. Preferably, (B) is the product of (cyclo)trimerization of an aliphatic isocyanate monomer containing a linear or branched alkylene chain, in particular of polymethylene diisocyanate, or of a mixture of aliphatic isocyanate monomers containing a linear alkylene chain with other polyisocyanate monomers, more particularly the isocyanurate polyisocyanate HDT (hexamethylene diisocyanate trimer) obtained by catalytic cyclotrimerization of hexamethylene diisocyanate (HDI), it being possible for the isocyanate function(s) to be temporarily blocked or otherwise.

Compound (B) can be added to the reaction mixture comprising (A) in purified form (at least 99% by weight of oligomers or polymers) or in crude form with the monomers $B_1$ and, where appropriate, $B_2$.

However, it is preferred to add the mixture containing monomers only if the conditions for distilling the monomers $B_1/B_2$ from $A_1/A_2$ are easy or when the percentage of monomers leaving the distillation is identical or only slightly different from that introduced for the polymerization, advantageously (cyclo)trimerization, reaction.

In general, it is preferred to use a compound (B) corresponding to the following general formulae:

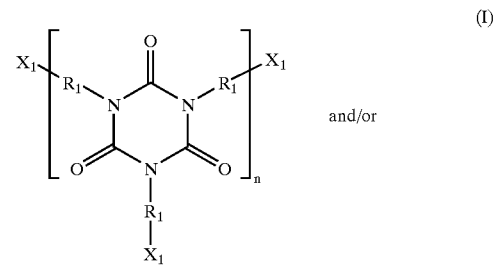

and/or

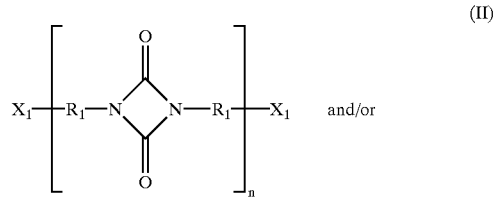

and/or

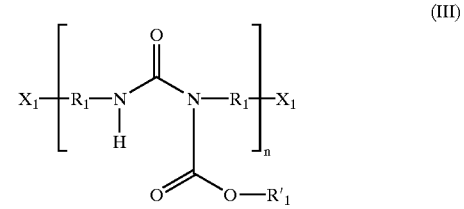

in which $R_1$, which may be identical or different, represent H or an aliphatic hydrocarbon-based chain, preferably a linear $C_3$–$C_{20}$ alkylene chain, and $X_1$ is chosen from:

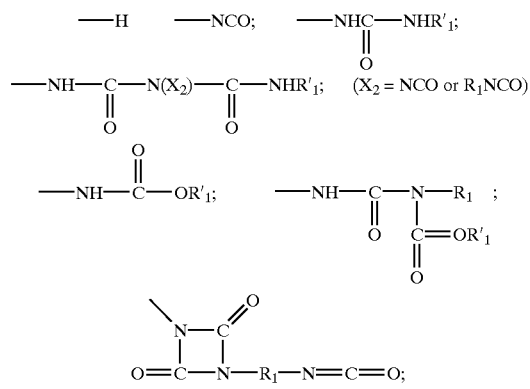

$R_1$ being as defined above and $R'_1$ is the aliphatic or cycloaliphatic hydroxycarbon-based residue of a polymer, in particular of a polyol, which is advantageously $C_3$–$C_{50}$, preferably $C_3$–$C_{30}$, optionally interrupted by one or more oxygen and/or sulphur atom(s) and optionally comprising aromatic and heterocyclic units in the chain and optionally one or more substituents, in particular arylene or alkyl groups, fluoro or silyl groups, etc.;

n is an integer between 1 and 7.

In general, it is preferred for (B) to represent a true polyisocyanate trimer. The expression "true trimer" is intended to mean an oligomer comprising an isocyanurate ring and only one, and constituting the product of theoretical cyclocondensation of three moles of isocyanate monomers, preferably diisocyanate monomers, it being possible for triisocyanates also to be suitable, with the exception of compounds originating from the condensation of more than four monomers and/or containing allophanate groups, as well as the oligomers containing isocyanurate units obtained by oligomerization of a polyisocyanate containing an isocyanurate unit.

It is generally preferred for the monomers $B_1$, from which B is obtained, to be isocyanates, preferably diisocyanates or triisocyanates in which at least one, preferably two and, where appropriate, three of the carbon atoms bearing isocyanate functions are not secondary, tertiary or neopentyl carbon atoms.

The best results are obtained for monomers in which the hydrocarbon-based skeleton consists of a polymethylene sequence —$(CH_2)_n$—, n advantageously being between 2 and 10.

The oligomeric and/or polymeric compounds described in EP 524,500 and those described in FR 2,613,363 can be used in particular as compound (B).

A preferred compound B is the HDT corresponding to the formula

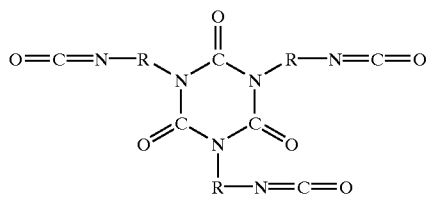

in which R is —$(CH_2)_6$—.

HDT is a known product, obtained by catalytic cyclotrimerization of hexamethylene diisocyanate (HDI), which is fluid at room temperature and has a viscosity of about 2.5 Pa.s at 25° C.

In addition, HDT is used in paint formulations in combination with IPDT at IPDT contents generally of less than 50% by weight.

Consequently, its addition during distillation phases does not cause any drawbacks since its presence in the final product is not only generally harmless, but can even be desirable.

The reason for this is that, as indicated above, it has been determined that the polyisocyanate (poly)isocyanurate mixtures obtained after the co-distillation process of the invention make it possible, by polycondensation with polyols, to obtain polyurethane coatings with remarkable and unexpected properties of strength and speed of drying of the films.

The NBDT (norbornane diisocyanate trimer)/HDT and IPDT/HDT and $H_{12}$MDT/HDT mixtures or the mixtures of other diisocyanate trimers or dimers, of high viscosity, in particular cycloaliphatic ones, with diisocyanate dimers or trimers obtained by mixing and by co-distillation of the two respective compounds makes it possible subsequently to obtain, by polycondensation with polyols, polyurethane films which have properties equivalent to those of the polyurethane coatings obtained with co-trimers prepared by catalytic cyclotrimerization of the same cycloaliphatic diisocyanate monomers with hexamethylene diisocyanate.

Lysine triisocyanate compounds, which are virtually undistillable but represent good viscosity-reducing agents, including their monomer form, are also suitable for the purposes of the invention. They can also be used in partially condensed trimer form, i.e. in the form of the cyclotrimerization mixture comprising true trimers (containing an isocyanurate ring) mixed with the monomers and possibly the dimers (uretdione).

By virtue of the invention, any high-viscosity oligomer or polymer obtained by polymerization or poly-condensation of isocyanate monomers or of a mixture of isocyanate monomers, or copolymerization of isocyanate monomers with another copolymerizable compound, can be separated, by distillation, from the unconverted monomers, at temperatures which are compatible with an industrial process, including oligomers and polymers with a very high viscosity, of greater than 50 Pa.s at 25° C., and products which are solid at room temperature.

In general, the best results are obtained:

when B comprises no hydrogen capable of forming a hydrogen bond; or when B comprises a hydrogen atom capable of forming an intramolecular hydrogen bond (allophanates).

Compound (B) according to the invention can thus be used in particular to reduce the viscosity during the phases of distillation of the following high-viscosity polyisocyanates or mixture of polyisocyanates:

(poly)isocyanurate polyisocyanates, e.g. polymers containing at least one isocyanurate ring, obtained by polycondensation of aliphatic monomers, preferably containing a non-branched chain, (poly)isocyanurate polyisocyanates comprising carbamate and/or allophanate groups, polyisocyanates comprising biuret, carbamate and/or allophanate groups, polyisocyanates comprising uretdione groups, and polyisocyanate polyurethane prepolymers, obtained by condensation of isocyanate monomers, in particular diisocyanates, with a long-chain polyol, in particular the prepolymers of the type described in U.S. Pat. No. 5,115,071 obtained by polymerization of polyfunctional polyisocyanates comprising aromatic polyisocyanates such as toluene diisocyanate, tetramethylxylene diisocyanate and diphenylmethane diisocyanate; cycloaliphatic polyisocyanates such as cyclohexane diisocyanate, isophorone diisocyanate, norbornane diisocyanate or 2,5(6)-diisocyanatomethylbicyclo[2.2.1]heptane, NBDI), 1,3-bis(isocyanatomethyl)cyclohexane (1,3-BIC), dicyclohexylmethane diisocyanate or 4,4-dicyclohexylmethanediyl diisocyanate ($H_{12}$MDI) and cyclohexyl 1,4-diisocyanate; and linear aliphatic polyisocyanates such as hexamethylene diisocyanate, with a polyol preferably having a functionality of greater than 2, more particularly between 2.2 and 4, and a weight-equivalent average weight of between 62 and 10,000, advantageously 62 and 5000, preferably 62 and 2000. Representative examples are trimethylolpropane, glycerol, pentaerythritol, dipentaerythritol, trihydroxybutane, ethylene glycol and partially alkoxylated adducts thereof, or polyisocyanate prepolymers comprising various urea, biuret, amide, ester, etc. functions.

These (poly)isocyanate compounds (A) correspond in particular to the following formulae:

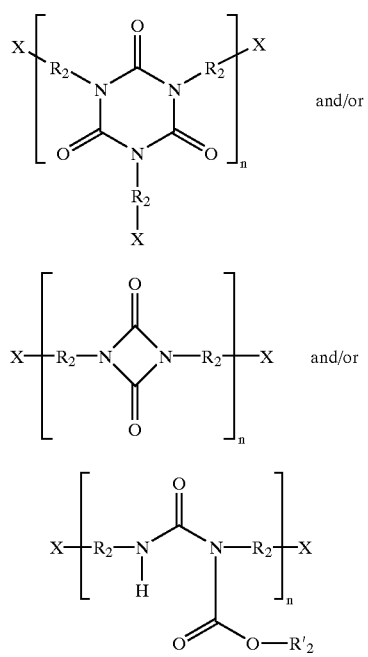

in which the groups $R_2$, which may be identical or different, are chosen from an aliphatic, cycloaliphatic or aromatic hydrocarbon-based chain preferably comprising from 2 to 50 atoms, preferably from 2 to 20 carbon atoms, the aliphatic or cycloaliphatic chains optionally being substituted with or interrupted by one or more, preferably $C_4$–$C_8$, arylene groups, $R'_2$ is the hydrocarbon-based residue generally of a polymer, in particular of a polyol, which is preferably $C_3$–$C_{50}$, optionally interrupted by one or more oxygen and/or sulphur atom(s) and optionally comprising aromatic and heterocyclic units in the chain and one or more substituents, in particular arylene or alkyl groups, or fluoro or silyl groups, etc.; n is an integer between 1 and 7, and X is a group chosen from

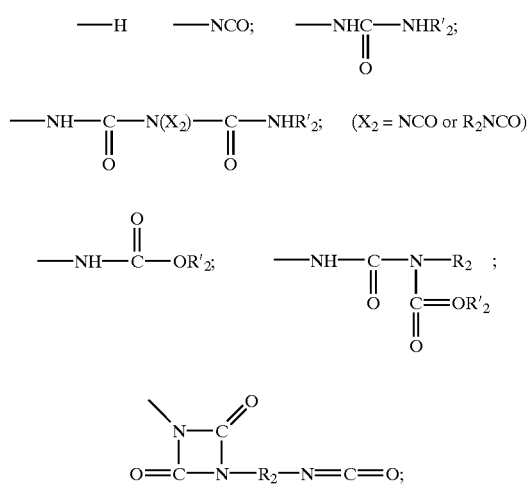

$R_2$ and $R'_2$ being as defined above.

The high-viscosity compound (A) is advantageously a polyisocyanate isocyanurate or biuret obtained by catalytic (cyclo)trimerization of cycloaliphatic diisocyanates, preferably IPDT, NBDT, $H_{12}$MDT or 1,3-BDT (1,3-BIC trimer) or of branched aliphatic diisocyanates, for example MPDT (2-methylpentamethylene diisocyanate trimer).

Compound (B) is added to the crude polymerization mixture in a compound (B)/compound (A) weight ratio of between 5/95 and 49/51, preferably between 5/95 and 45/55.

The viscosity-reducing compound (B) can be added to the crude mixture obtained after the polymerization reaction of the starting isocyanate monomers with each other and/or with another compound, in particular a polyol as defined above, directly in the polymerization reactor, or can be added to the resulting crude mixture by in-line mixing before admission into the distillation train, in order then to be co-distilled with the high-viscosity oligomer or polymer which it is desired to separate from the unconverted monomer(s).

The co-distillation temperature is advantageously in the range between 120 and 250° C., preferably between 150° C. and 210° C.

A subject of the invention is also the use of one (or more) oligomeric or polymeric compound(s) (B) of viscosity (b) obtained by polymerization of isocyanate monomers or copolymerization of isocyanate monomers with another polymerizable compound, for the separation of an oligomeric or polymeric compound (A) of viscosity (a), obtained by polymerization of isocyanate monomers or copolymerization of isocyanate monomers with another polymerizable compound, from the corresponding isocyanate monomers, by co-distillation of the said compound(s) (B) and (A), the ratio of the viscosities b/a being less than 1/1.5, preferably less than 1/2, and the amount by weight of compound (B) relative to the mixture (A) and (B) being less than 50%.

A subject of the invention is also a polyisocyanate composition containing one or more isocyanurate functions, comprising:

from 51 to 95% by weight of a first polyisocyanate obtained by (cyclo)trimerization of isocyanate monomers, and optionally another copolymerizable monomer, from 5 to 49% by weight of a second polyisocyanate obtained by (cyclo)trimerization of isocyanate monomers, and optionally another copolymerizable monomer, in which the ratio of the viscosities of the second polyisocyanate to the first polyisocyanate is less than 1/1.5, preferably less than 1/2, the said composition being obtained by co-distillation of the said first polyisocyanate and of the said second polyisocyanate and being characterized in particular by the presence, in the composition obtained after the distillation, of traces of mixed compounds of the said first polyisocyanate and of the said second polyisocyanate linked by dimeric bridging.

The isocyanate monomers are advantageously diisocyanates or triisocyanates, diisocyanates being preferred.

These compositions make it possible to obtain polyurethane films with excellent properties of mechanical strength and of resistance to bad weather, at the same time as excellent film-drying properties.

The polyisocyanates obtained by the process of the invention are advantageously used as hardeners for the preparation of coatings, in particular polyurethane paints and varnishes, by reacting polyisocyanates with a polyol.

To this end, any type of polyol is suitable.

However, it has been found, surprisingly, that certain polyols provide appreciable advantages when they are reacted with polyisocyanates obtained in accordance with the present invention.

These polyols can be of acrylic or polyester nature.

When a polyol of acrylic nature is used, it is preferred for this polyol to satisfy the following conditions for a solids content (SC) of between 75–80% by weight.

Mw (weight-average molecular weight) not greater than 10,000, advantageously not greater than 5000, preferably not greater than 2000.

Mw is preferably less than 10,0000, advantageously less than 5000, preferably less than 2000.

Mn (number-average molecular weight) not greater than 5000, advantageously not greater than 3000, preferably not greater than 800.

Mn is preferably less than 5000, advantageously less than 3000, preferably less than 800.

Mw/Mn (dispersity ratio) not greater than 5, advantageously not greater than 3, preferably not greater than 2.

Mw/Mn is preferably less than 5, advantageously less than 3, preferably less than 2.

number of OH/molecule greater than or equal to 2, advantageously greater than 2.

For further details, reference may be made to ASTM standard E222.

The Mn and Mw values are advantageously obtained by gel permeation exclusion chromatography taking styrene as standard.

Polyols obtained by polymerization of hydroxyalkyl (meth)acrylates, in particular hydroxyethyl (meth)acrylate and hydroxypropyl (meth)acrylates, are preferred.

The resins sold under the names Joncryl SCX 922 (Johnson Polymers) and Synocure 866 SD (Cray Valley) are most particularly preferred.

When the polyols are of polyester nature, the ones preferred are those with a 100% SC and a viscosity of not greater than 10,000 mPa.s, advantageously not greater than 5000 mPa.s, preferably not greater than 1000 Pa.s, whose Mw is generally between 250 and 8000.

In order to obtain a satisfactory viscosity, it is also possible to add a reactive solvent to the polyol before or after mixing with the polyisocyanate.

Advantageously, an amount of reactive diluent of not greater than 30%, advantageously not greater than 20%, preferably not greater than 10%, by mass relative to the dry mass of the polyol is used.

Considerable advantages in terms of properties of the final coating are already obtained for an amount of reactive solvent of less than 10% by weight. These properties, in particular the speed of drying, the hardness of the coating and the impact strength are also excellent when the amount of reactive solvent is lowered, which includes the absence of reactive solvent.

Another subject of the invention consists of the compositions for simultaneous or successive application, comprising:

a polyisocyanate composition obtained by the process of the invention, and a polyol as defined above.

The compositions obtained by the process of the invention can be used in particular in aqueous coating formulations, by being placed in suspension, in emulsion or in dispersion, or dissolved by grafting hydrophilic agents or by addition of surfactant compounds.

The compositions of the invention can undergo a reaction of partial or complete temporary masking of the isocyanate functions with one or a mixture of masking agents.

The isocyanate functions can then be restored by applying a physicochemical process such as increasing the temperature, or can be converted or polymerized by applying a physicochemical process such as ultraviolet radiation.

The compositions according to the invention can also be in the form of suspensions.

They can comprise, besides the components described above:

optionally one or more inorganic or organic compound(s) with a pigmentation or filler function, a matt-effect agent or any other additive intended to facilitate the application of the coating or to improve the properties of the coating, such as, for example, a spreading agent, a "cicatrizing" agent, etc., optionally one or more catalysts, optionally one or more surface agents to improve the use of the formulation, such as, for example, an agent with a surfactant property, an anti-foaming agent, a solvent, an aqueous solution whose pH is optionally adjusted.

The examples below illustrate the invention.

EXAMPLE 1

Separation of Isophorone Diisocyanate Trimer (IPDT) from the Unconverted Isophorone Diisocyanate (IPDI) Monomers HDT was added, in the proportions indicated in Table I below, to an IDPI trimerization crude product containing the indicated proportions of IPDT and of unconverted monomer.

The IPDI/IPDT/HDT mixture was introduced into a scraped-film evaporator.

TABLE I

| | Composition of the synthetic mixture before distillation | | | Fractions by weight | | | T° distillation | Final monomer content | |
|---|---|---|---|---|---|---|---|---|---|
| Test | IPDI | IPDT* | HDT** | IPDI | IPDT | HDT | ° C. | HDI | IPDI |
| 1 | 105 | 70 | 30 | 51.22% | 34.15% | 14.63% | 190 | 0.10% | 0.20% |
| 2 | 90 | 60 | 40 | 47.37% | 31.58% | 21.05% | 190 | 0.05% | 0.15% | pressure: 0.5 mbar (50 Pa)
*IPDT: solid at 25° C.
**HDT: 2500 mPa · s at 25° C.

The addition of HDT makes it possible to separate the IPDT from the IPDI at a temperature of 190° C.

For the two synthetic mixtures tested, final monomer contents which are compatible with the specification selected for this type of product: Σ monomers<0.5% by weight after adding 20% of formulation solvent, are obtained.

EXAMPLE 2

Separation of Norbornyl Diisocyanate Trimer (NBDT) from Norbornyl Diisocyanate (NBDI) Monomer HDT was added, in the proportions indicated in Table II below, to an NBDI trimerization crude product containing the indicated proportions of NBDT trimer.

The NBDI/NBDT/HDT mixture was introduced into a scraped-film evaporator.

TABLE II

| Test | Composition of the synthetic mixture before distillation | | | Fractions by weight | | | T° distillation | Final monomer content | |
|---|---|---|---|---|---|---|---|---|---|
| | NBDI | NBDT* | HDT** | NBDI | NBDT | HDT | ° C. | HDI | NBDI |
| 292BEL97 | 105 | 70 | 30 | 51.22% | 34.15% | 14.63% | 190 | 0.10% | 0.30% |

*IPDT: solid at 25° C.
**HDT: 2500 mPa · s at 25° C.

In this case, the addition of HDT makes it possible to separate the monomer from the trimer at a temperature of 190° C. and also to obtain an NBDT/HDT mixture which is compatible with the specification selected for this type of product: monomer content<0.5% by weight.

Co-distillation of the polyisocyanate polymers/oligomers with HDT under the conditions of the invention can lead, by dimeric bridging, to other HDT-polisocyanate polymer/oligomer mixed species, which are found in the final product.

EXAMPLE 3

Property of Varnishes Obtained with NBDT/HDT and IPDT/HDT Mixtures According to the Invention Varnishes were prepared based on a mixture of two acrylic polyols dissolved in butyl acetate: ®Joncryl 912/®Joncryl 922 (25/75) with the following various hardeners:

1. HDT alone (control),
2. NBDI/HDI co-trimer (66/34) (obtained by copolymerization of NBDI and HDI),
3. NBDI/HDI co-trimer (48/52) (obtained by copolymerization of NBDI and HDI),
4. NBDT/HDT mixture (70/30) (obtained by co-distillation according to the invention),
5. IPDT/HDT mixture (70/30) (obtained by co-distillation according to the invention),
6. IPDT/HDT physical mixture (70/30),
7. IPDT/HDT (60/40) (obtained by co-distillation according to the invention).

The NCO/OH ratio was set at 1.05 and the viscosity of each varnish was adjusted to about 25 seconds with the Ford No. 4 fraction.

The following parameters were evaluated:
the volatile organic content (VOC),
the pot-life (time required to double the initial viscosity),
the dust-free drying time (test of glass beads on varnishes applied to glass plates with a 200 μm gauge),
the Persoz hardness after 1, 3 and 7 days of drying at room temperature and after 1 and 7 days following an oven treatment for 30 minutes at 60° C.,
the resistance to methyl ethyl ketone (MEK) graded from 1 to 5 (1=excellent and 5=poor),
(deposition of one drop for 2 minutes under a watch glass),
the resistance to acids on films after maturation for more than 21 days at room temperature, graded from 1 to 5 (1=good and 5=very poor).

The results are collated in Table III below:

TABLE III

| | Viscosity CF4 | VOC (g/l) | Pot-life | Dust-free drying time | Persoz hardness drying at room temperature | | |
|---|---|---|---|---|---|---|---|
| | | | | | 1 day | 3 days | 7 days |
| 1 | 27.0 s | 402 | 2 h 24 | 5 h 45 | 166 | 235 | 234 |
| 2 | 25.6 s | 432 | 2 h 46 | 2 h 20 | 209 | 276 | 268 |
| 3 | 25.6 s | 417 | 3 h 10 | 4 h 30 | 181 | 235 | 230 |
| 4* | 24.6 s | 440 | 2 h 50 | 1 h 43 | 211 | 272 | 277 |
| 5* | 25.8 s | 468 | 4 h 50 | 1 h 12 | 250 | 311 | 310 |
| 6 | 24.9 s | 444 | 5 h 25 | 1 h 55 | 270 | 318 | 322 |
| 7* | 26.9 s | 442 | 3 h 43 | 2 h 45 | 219 | 281 | 286 |

*products obtained according to the invention (co-distillation)

The compositions obtained by co-distillation according to the invention allow a faster drying speed than physical mixtures containing the same proportions.

TABLE III (continued)

| | Oven treatment for 30 minutes at 60° C. followed by maturation at room temperature | | Resistance to MEK | | Resistance to acids* | |
|---|---|---|---|---|---|---|
| | 1 day | 7 days | Air drying | Oven treatment | Air drying | Oven treatment |
| 1 | 199 | 267 | 2–3 | 1 | 4 | 4 |
| 2 | 264 | 314 | 1 | 1 | 4 | 1 |
| 3 | 234 | 301 | 1 | 1 | 4 | 2 |
| 4 | 244 | 297 | 1 | 1 | 3–4 | 1–2 |
| 5 | 285 | 333 | 1 | 1–2 | 1 | 1 |
| 6 | 296 | 317 | 1 | 2 | 1 | 1 |
| 7 | 260 | 315 | 1 | 1–2 | 1 | 1 |

*Resistance to a normal solution of 3 acids: sulphuric acid (65 parts), nitric acid (30 parts), hydrochloric acid (5 parts).

The compositions obtained by co-distillation have, for the same weight ratio, better resistance to solvents than the compositions obtained by physical mixing in the same proportions.

EXAMPLE 4

Properties of Paints Obtained with NBDT/HDT and IPDT/HDT Mixtures Obtained by Co-distillation According to the Invention A white paint was prepared with the following composition by weight:

| Polyol | ®Joncryl 912/®Joncryl 922 (25/75) | 49.47% |
|---|---|---|
| Solvent | Butyl acetate/®Solvesso 100 (60/40) | 11.23% |
| Dispersant | ®Disper BYK 160/xylene (50/50) | 1.34% |
| Pigment (TiO$_2$) | ®Rhoditan RL 60 | 37.96% | to which were added the following hardener compositions:
1. HDT alone (control),
2. co-distilled NBDT/HDT mixture (70/30),
3. co-distilled NBDT/HDT mixture (70/30)+HDT to obtain a 50/50 NBDT/HDT final composition,
4. co-distilled NBDT/HDT mixture (70/30)+HDT to obtain a 30/70 NBDT/HDT final composition,
5. co-distilled IPDT/HDT mixture (70/30)+HDT to obtain a 50/50 IPDT/HDT final composition,
6. IPDT+HDT physical mixture (50/50).

The proportions of the hardeners 1 to 6 relative to 120 g of food paste, as well as the solvents added, the viscosity obtained and the VOC (measured at the application viscosity for 30 seconds with the Ford fraction No. 4), are given in Table IV below:

TABLE IV

| | Nature of the hardener | Mass of hardener | Solvent added | FF4 viscosity obtained | VOC (g/l) |
|---|---|---|---|---|---|
| 1 | HDT | 21.05 g | 19.87 g | 29 s 90 | 383 |
| 2 | HDT/NBDT* | 23.08 g | 20.78 g | 29 s 44 | 399 |
| 3 | HDT/NBDT* | 24.67 g | 20.30 g | 28 s 89 | 405 |
| 4 | HDT/NBDT* | 29.80 g | 21.25 g | 29 s 13 | 412 |
| 5 | IPDT/HDT* | 27.41 g | 21.94 g | 28 s 64 | 425 |
| 6 | IPDT/HDT | 27.24 g | 20.64 g | 29 s 31 | 404 |

*co-distilled mixture

The following tests were carried out after maturation for seven days:

on a steel plate:
  measuring the dry thickness,
  Persoz hardness,
  grid adhesion graded from 1 to 5 (1=excellent and 5=poor),
  Erichsen sleeve,
  impacts (ASTM and AFNOR),
  resistance to xylene, to MEK and to acids,
on aluminium plates:
  conical mandrel
accelerated ageing (UVB) on QUV plates: loss of sheen and yellowing.

The results are given in Tables V and VI below:

TABLE V

| | Thickness ($\mu$m) | Persoz hardness | Adhesion | Sleeve | Impacts ASTM (in · lbs)/ AFNOR (cm · kg) | Xylene (number of to-and-fro motions) | MEK (number of to-and-fro motions)* | Acids |
|---|---|---|---|---|---|---|---|---|
| 1 | 48.0 | 282 | 0/1 | 8.43 | 80/100 | >100 | >100–0 | 1–2 |
| 2 | 44.4 | 337 | 2 | 8.10 | <5/<10 | 100 | 100–3 | 1 |
| 3 | 42.7 | 325 | 1 | 8.23 | 10/50 | 100 | 100–2/1 | 1 |
| 4 | 38.5 | 313 | 1 | 8.46 | 80/100 | 100 | >100/1 | 1–2 |
| 5 | 46.5 | 295 | 2 | 7.40 | <5/<5 | 100 | 100–3 | 1–2 |
| 6 | 39.4 | 316 | 1 | 8.10 | <10/5 | 100 | >100–2 | 1–2 |

*Grading:
0: film not attacked
1: film very slightly attacked
2: film attacked
3: film wrinkled
4: film dissolved
5: support visible
**Grading:
0: no effect visible to the naked eye
1: ring microbubbles slightly visible
2: ring of screws/craters
3: mark clearly visible and bubbling
4: sticky film
5: film destroyed

What is claimed is:

1. A method for separating one (or more) oligomeric or polymeric compound(s) A obtained by polymerization or polycondensation of cycloaliphatic isocyanate monomers (A$_1$) with each other or polymerization polycondensation of cycloaliphatic isocyanate monomers (A$_1$) with another copolymerizable monomer compound (A$_2$), from the unconverted monomer(s), said compound(s) A having, in the presence of an amount of monomers (A$_1$ and optionally A$_2$) of not more than 1% by weight, a viscosity (a), comprising the steps of:
  i) lowering the viscosity of the crude polymerization or poly-condensation mixture containing said compound(s) A by adding thereto one or more compound(s) B of viscosity (b) such that b/a is less than 1/1.5, in an amount of less than 50% by weight of the mixture A plus B; and
  ii) co-distillating the mixture thus obtained so as to separate the compound(s) (A) and (B) from the unconverted monomers.

2. The method of claim 1 wherein in step i) the weight ratio of B/A is less than 1/2.

3. The method of claim 1, wherein the weight ratio of (B)/(A) is between 5/95 and 45/55.

4. The method of claim 1, wherein said compound (B) is an oligomeric or polymeric compound obtained by polymerization of isocyanate monomers ($B_1$) or copolymerization of isocyanate monomers ($B_1$) with another polymerizable compound ($B_2$).

5. The method of claim 1, wherein said compound (A) is an oligomeric or polymeric compound selected from the group consisting of polyisocyanates obtained by catalytic (cyclo)trimerization of cycloaliphatic diisocyanates, polyurethane prepolymers obtained by condensation of a isocyanate monomers with a long-chain polyol, polyisocyanates, polyisocyanurates comprising carbamate and/or allophanate groups, oligomers and/or polymers comprising biuret groups and oligomers and/or polymers comprising uretdione groups.

6. The method of claim 1, wherein (A) has, in the presence of an amount of monomers of not greater than 1% by weight, a viscosity of greater than $10^4$ mPa.s at 25° C., or is solid at 25° C.

7. The method of claim 1, wherein (A) has, in the presence of an amount of monomers of no greater than 0.5% by weight, a viscosity of greater than $10^4$ mPa.s at 25° C., or solid at 25° C.

8. The method of claim 1, wherein (A) is selected from the group consisting of IPDT, NBDT, 1,3-BDT, $H_{12}$-MDT and MPDT.

9. The method of claim 1, wherein (B) is a polyisocyanate, optionally comprising an isocyanurate unit, obtained by catalytic cyclotrimerization of isocyanate monomers or of a mixture of isocyanate monomers, optionally comprising carbamate, biuret, uretdione and/or allophanate groups.

10. The method of claim 1, wherein (B) comprises an isocyanurate polyisocyanate obtained by catalytic cyclotrimerization of aliphatic isocyanates and/or a dimer containing a uretdione unit obtained by dimerization of said isocyanates and/or a compound comprising a biuret group obtained by trimerization of said isocyanates with another monomer.

11. The method of claim 4, wherein $B_1$ is isocyanate, optionally a diisocyanate in which at least one of the carbon atoms, and, where appropriate, the three carbon atoms bearing an isocyanate function are not secondary, tertiary or neopentyl carbon atoms.

12. The method of claim 4, wherein $B_1$ has a linear hydrocarbon chain.

13. The method of claim 4, wherein $B_1$ has a hydrocarbon chain consisting of a (CH2)n sequence, n being between 2 and 10.

14. The method of claim 1, wherein (B) has, in the presence of an amount of monomers of not greater than 1% by weight, a viscosity of less than $5\times10^3$ mPa.s at 25° C.

15. The method of claim 1, wherein (B) has, in the presence of an amount of monomers of not greater than 0.5% by weight, a viscosity of less than $5\times10^3$ mPa.s 25° C.

16. The method of claim 1, wherein (B) is hexamethylene diisocyanate trimer.

17. The method of claim 1, wherein said compound (B) is added to the crude mixture resulting from the polymerization reaction of the starting isocyanate monomer(s) ($A_1$) and optionally ($A_2$) directly in the polymerization reactor or by in-line mixing before admission of the resulting mixture into the distillation train.

18. A composition comprising:
from 51 to 95% by weight of a first polyisocyanate obtained by (cyclo)trimerization of cycloaliphatic diisocyanate monomers, and optionally another copolymerizable monomer,
from 5 to 49% by weight of a second polyisocyanate obtained by (cyclo)trimerization of diisocyanate monomers, and optionally another copolymerizable monomer, the ratio of the viscosities of said second polyisocyanate to said first polyisocyanate being less than 1/1.5, said composition being obtained by co-distillation of said first polyisocyanate and of said second polyisocyanate and comprising traces of mixed compounds of said first polyisocyanate and of said second polyisocyanate linked by dimeric bridging.

19. The composition of claim 18, wherein the ratio of the viscosities of said second polyisocyanate to said first polyisocyanate is less than 1/2.

20. The composition of claim 18, wherein said first polyisocyanate and/or said second polyisocyanate comprises an isocyanurate group.

21. The composition of claim 18, comprising:
from 51 to 95%, by weight of polyisocyanate containing isocyanurate unit(s) obtained by cyclotrimerization of 2,5(6)-diisocyanatomethylbicyclo-[2.2.1]heptane, and
from 5 to 49%, by weight of polyisocyanate containing isocyanurate unit(s) obtained by cyclotrimerization of hexamethylene diisocyanate, the isocyanate functions in the polyisocyanates optionally being blocked with a blocking group, said blocking group not being capable of being deblocked at the distillation temperature of the composition as defined above.

22. The composition according to claim 18, comprising:
from 60 to 80% by weight of polyisocyanate containing isocyanurate unit(s) obtained by cyclotrimerization of norbornane diisocyanate,
from 20 to 40% by weight of polyisocyanate containing isocyanurate unit(s) obtained by cyclotrimerization of hexamethylene diisocyanate, the isocyanate functions in the polyisocyanates optionally being blocked with a blocking group, the said blocking group not being capable of being deblocked at the distillation temperature of the composition as defined above.

23. A polyurethane coating comprising the composition of claim 18.

24. A composition for simultaneous or successive application, comprising:
at least one polyisocyanate composition according to claim 18, and
a polyol.

25. The composition of claim 24, wherein said polyol is an acrylate polyol which satisfies the following conditions for a solids content (SC) of between 75 and 80% by weight:
Mw (weight-average molecular weight) not greater than 10,000;
Mn (number-average molecular weight) not greater than 5000;
Mw/Mn (dispersity ratio) not greater than 5;
number of OH/molecule greater than or equal to 2.

26. The composition of claim 24, wherein said polyol is a polyester polyol with a solids content of 100% and a viscosity of not greater than 10,000 mPa.s, and an Mw of between 250 and 8000.

27. The composition of claim 24, comprising a crosslinking.

28. The composition of claim 27, wherein the crosslinking catalyst is a latent catalyst.

* * * * *